March 25, 1958 E. R. ALLER ET AL 2,828,163
CONVEYORS FOR PULVERULENT MATERIALS
Filed April 23, 1956
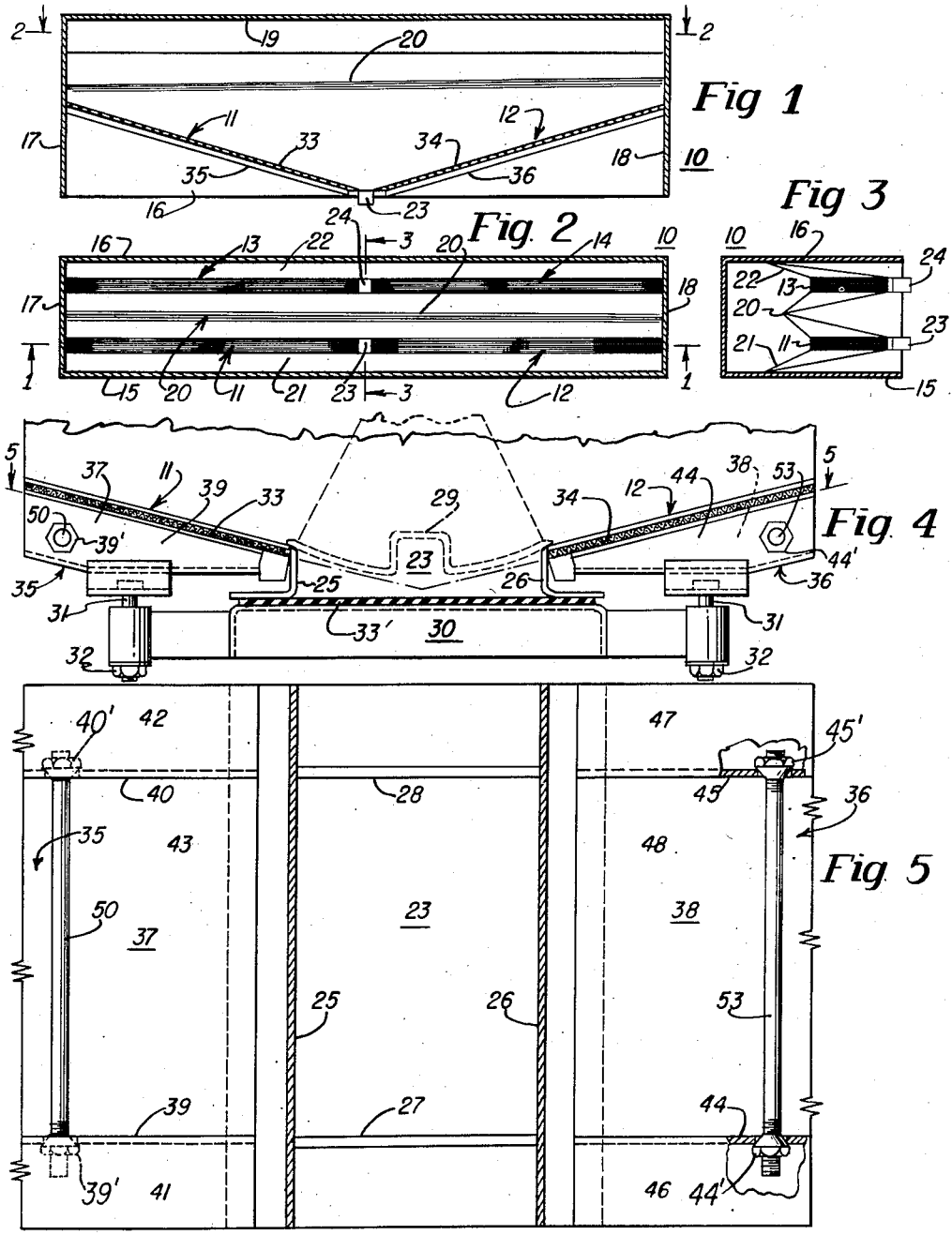
INVENTORS
Edmund R. Aller
BY LeRoy Kramer Jr.
Smith, Olsen, Baird & Miller
Attys.

United States Patent Office 2,828,163
Patented Mar. 25, 1958

2,828,163

CONVEYORS FOR PULVERULENT MATERIALS

Edmund R. Aller, Ogden Dunes, Ind., and Le Roy Kramer, Jr., Highland Park, Ill., assignors to General American Transportation Corporation, Chicago, Ill., a corporation of New York Application April 23, 1956, Serial No. 579,873

5 Claims. (Cl. 302—29)

The present invention relates to self-unloading vehicle bodies for pulverulent materials, and more particularly to conveyors for the pulverulent materials incorporated in such bodies.

In U. S. Patent No. 2,589,968, granted on March 18, 1952, to Henry R. Schemm, there is disclosed a self-unloading vehicle body comprising a conveyor for pulverulent material including an elongated downwardly inclined porous wall, first structure cooperating with the porous wall to define an elongated material trough thereabove, and second structure cooperating with the porous wall to define an elongated plenum chamber therebelow. In the arrangement, the porous wall constitutes the floor of the material trough and the ceiling of the plenum chamber so that pulverulent material in the material trough flows downwardly along the floor toward the lower or discharge end of the material trough when it is aerated by air under pressure penetrating the porous wall from the plenum chamber. The operation of the conveyor is predicated upon the phenomenon that a powdered material of given composition and fineness, when thoroughly aerated and at a specific and constant angle of repose, will be transported downwardly along the porous wall or floor of the material trough toward the lower or discharge end thereof when the angle of inclination of the porous wall or floor is slightly greater than the angle of repose of the powdered material that is being conveyed.

It is a general object of the present invention to provide in a conveyor of the character described an improved and simplified arrangement for facilitating inspection of the plenum chamber and testing of the condition thereof so as to insure a sanitary condition thereof when the conveyor is employed in conveying flour or other edible materials.

Another object of the invention is to provide in a mobile vehicle of the character described, a conveyor for pulverulent material that incorporates improved structure facilitating ready inspection of the plenum chamber thereof.

A further object of the invention is to provide in a conveyor of the character described, improved and simplified structure for closing and sealing inspection ports that are provided in the plenum chamber thereof.

Further features of the invention pertain to the particular arrangement of the elements of the conveyor, whereby the above-outlined and additional operating features thereof are attained.

The invention, both as to its organization and method of operation, together with further objects and advantages thereof, will best be understood by reference to the following specification taken in connection with the accompanying drawing, in which:

Figure 1 is a longitudinal vertical sectional view of a vehicle body incorporating a conveyor for pulverulent material and embodying the present invention, this view being taken in the direction of the arrows along the line 1—1 in Fig. 2;

Fig. 2 is a longitudinal horizontal sectional view of the vehicle body, taken in the direction of the arrows along the line 2—2 in Fig. 1;

Fig. 3 is a lateral vertical sectional view of the vehicle body, taken in the direction of the arrows along the line 3—3 in Fig. 2;

Fig. 4 is a greatly enlarged fragmentary longitudinal vertical sectional view of one of the discharge ports provided in the lower central portion of the vehicle body, this view comprising an enlargement of the central lower portion of the structure shown in Fig. 1; and Fig. 5 is a greatly enlarged fragmentary substantially horizontal view of the discharge port shown in Fig. 4, this view being taken in the direction of the arrows along the offset line 5—5 in Fig. 4.

Referring now to Figs. 1 to 3, inclusive, of the drawing, there is illustrated a vehicle body 10 in the form of a railway car, or the like, incorporating two pairs of conveyors 11—12 and 13—14 embodying the features of the present invention. More particularly, the vehicle body 10 comprises the usual elongated upstanding longitudinally extending side walls 15 and 16, the usual upstanding laterally extending connecting end walls 17 and 18, and the usual connecting top wall 19. Also the top wall 19 is provided with inlet structure, not shown. Further, the vehicle body 10 comprises a composite bottom wall arranged below the top wall 19 and extending laterally between the side walls 15 and 16 and longitudinally between the end walls 17 and 18; which composite bottom wall includes an elongated longitudinally extending substantially centrally disposed saddle-like partition 20 that is of substantially inverted V-shaped configuration in lateral cross-section, and a pair of elongated longitudinally extending aprons 21 and 22 respectively disposed adjacent to the respective sides 15 and 16.

The conveyors 11 and 12 comprise what may be termed a front pair that cooperates with a substantially centrally disposed front discharge port 23 provided in the composite bottom wall of the vehicle 10; and the conveyors 13 and 14 comprise what may be termed a rear pair that cooperates with a substantially centrally disposed rear discharge port 24 provided in the composite bottom wall of the vehicle 10; the front discharge port 23 being arranged between the front apron 21 and the central saddle 20, and the rear discharge port 24 being arranged between the rear apron 22 and the central saddle 20. In the arrangement: the front discharge port 23 is disposed in a lowermost central position with respect to the end walls 17 and 18 so that the conveyors 11 and 12 are downwardly inclined toward the front discharge port 23 from the respective end walls 17 and 18 and so that the front apron 21 is inclined downwardly and rearwardly from the front wall 15 toward the conveyors 11 and 12 and so that the front portion of the saddle 20 is inclined downwardly and forwardly toward the conveyors 11 and 12; and similarly, the rear discharge port 24 is disposed in a lowermost central position with respect to the end walls 17 and 18 so that the conveyors 13 and 14 are downwardly inclined toward the rear discharge port 24 from the respective end walls 17 and 18, and so that the rear apron 22 is inclined downwardly and forwardly from the rear wall 16 toward the conveyors 13 and 14 and so that the rear portion of the saddle 20 is inclined downwardly and rearwardly toward the conveyors 13 and 14; whereby the saddle 20 defines a front bin disposed in the lower front of the vehicle body positioned over the conveyors 11 and 12, as well as a rear bin disposed in the lower rear of the vehicle body positioned over the conveyors 13 and 14

The vehicle body 10 is adapted for the transportation of a pulverulent material, and specifically for the transportation of flour or other pulverized edible material; and in the arrangement, the four conveyors 11, 12, 13 and 14 are of substantially identical structure, each of the conveyors noted being downwardly inclined at an angle somewhat greater than that of the constant angle of repose of the pulverent material, when it is aerated; this angle being about 14° in the case of wheat flour.

The construction and arrangement of the conveyors 11 and 12 and their cooperation with the associated front discharge port 23 are the same as that of the conveyors 13 and 14 with respect to the rear discharge port 24; and the construction and the relationship will be best understood by reference to Figs. 4 and 5. As illustrated, the front discharge port 23 is defined by structure including a pair of laterally extending members 25 and 26 and a cooperating pair of longitudinally extending members 27 and 28; whereby the front discharge port 23 is of substantially rectangular configuration. Also the front discharge port 23 is provided with an associated valve gate 29, indicated in broken lines in its closed position in Fig. 4, that cooperates with the members 25, 26, 27 and 28; and of course, it will be understood that the valve gate 29 is selectively movable into open and closed positions with respect to the front discharge port 23. Also, the front discharge port 23 is provided with a lower stopper gate 30 that may be selectively placed and removed with respect thereto; which stopper gate 30 is retained in place by suitable pairs of cooperating bolts-nuts 31—32, the upper portion of the stopper gate 30 carrying a sealing pad 33', formed of resilient rubber, or the like, and cooperating with the lower portion of the members 25, 26, 27 and 28. It will be understood that when the stopper gate 30 is in place, the front discharge port 23 is sealed in its closed position; and when the stopper gate 30 is removed, the discharge of pulverent material from the front bin of the vehicle body 10 may be selectively controlled by the position of the gate valve 29.

The front conveyors 11 and 12 are of identical construction and arrangement and respectively comprise elongated longitudinally extending and downwardly inclined porous walls 33 and 34 respectively disposed on opposite sides of the front discharge port 23 and respectively terminating adjacent to the members 25 and 26; each of the porous walls 33 and 34 being formed of suitable fabric-like material, such, for example, as woven cotton threads and stainless steel reinforcing wire, as disclosed in the previously mentioned Schemm patent. Also the vehicle body 10 comprises elongated longitudinally extending structures 35 and 36 respectively disposed below the porous walls 33 and 34 and respectively defining elongated longitudinally extending plenum chambers 37 and 38 therebelow. Accordingly: in the conveyor 11, the porous wall 33 constitutes the floor of the structure disposed thereabove and defining the elongated material trough positioned thereabove, and the ceiling of the plenum chamber 37 disposed therebelow defined by the structure 35; and in the conveyor 12, the porous wall 34 constitutes the floor of the structure disposed thereabove and defining the elongated material trough positioned thereabove, and the ceiling of the plenum chamber 38 disposed therebelow and defined by the structure 36.

Further, the vehicle body 10 comprises mechanism, not shown, for supplying air into the plenum chambers 37, etc., respectively disposed below the porous walls 33, etc., in the conveyors 11, etc.; and it will be understood that when the stopper gate 30 is removed and the valve gate 29 occupies its open position the supply of air into the plenum chambers 37 and 38 causes the pulverent material to be conveyed by the respective conveyors 11 and 12 downwardly toward the front discharge opening 23 and therethrough to the exterior. At this point, it is mentioned that a cross conveyor, not shown, is ordinarily secured to the vehicle body 10 in sealed relation to the members 25, 26, 27 and 28 immediately below the front discharge opening 23 for the purpose of removing pulverent material into exterior storage when unloading of the vehicle body 10 is undertaken. The pulverent material slides downwardly along the porous walls 33 and 34 of the respective conveyors 11 and 12 as a consequence of aeration thereof by air supplied from the respective plenum chambers 37 and 38 by virtue of the porous character of the walls 33 and 34; whereby both sides of the front bin defined in the vehicle body 10 are simultaneously unloaded through the front discharge port 23.

Considering now in greater detail the construction of the plenum chambers 37 and 38, the structure 35 comprises a pair of opposed side walls 39 and 40 respectively provided with outwardly directed flanges 41 and 42 and a connecting bottom wall 43; and likewise, the structure 36 comprises a pair of opposed side walls 44 and 45 respectively provided with outwardly directed flanges 46 and 47 and a connecting bottom wall 48. Accordingly the structures 35 and 36 are of elongated longitudinally extending box-like character respectively disposed immediately below the porous walls 33 and 34. More particularly, the porous wall 33 is secured in place in covering relation with the plenum chamber 37 upon the flanges 41 and 42; and the porous wall 34 is secured in place in covering relation with the plenum chamber 38 upon the flanges 46 and 47.

Two laterally aligned inspection ports are respectively formed in the two opposing side walls 39 and 40 adjacent to the lowermost end of the structure 35 and to one side of the front discharge opening 23; which inspection ports are normally closed by respectively associated closure members 39' and 40' respectively disposed exteriorly of the side walls 39 and 40, the two movable closure members 39' and 40' being retained in place in sealed relation with the respective inspection ports by a tie bar 50 extending laterally therebetween and through the plenum chamber 37. Specifically, the closure members 39' and 40' are preferably formed as nuts that are received upon the opposite threaded ends of the tie bar 50. Accordingly, when the nuts 39' and 40' are in proper position, the inspection ports formed in the plenum chamber 37 are closed and sealed against the escape of air therethrough and upon loosening and removal of either one of the nuts 39' or 40' from the associated one end of the tie bar 50, the tie bar 50 may be removed through the other of the inspection ports, along with the other of the nuts, so that an inspector may see through the aligned inspection ports for the purpose of inspecting the condition of the interior of the plenum chamber 37. Also, it is preferred that the exterior surface of the tie bar 50 be provided with a smooth bright coating of nickel so that when the tie bar 50 is withdrawn from the plenum chamber 37, it may be inspected as an index of the condition of the interior of the plenum chamber 37. For example, the exterior surface of the tie bar 50 may be chemically plated with nickel in accordance with the process disclosed in U. S. Patent No. 2,532,283, granted on December 5, 1950, to Abner Brenner and Grace E. Riddell or in U. S. Patent No. 2,658,841, granted on November 10, 1953, to Gregoire Gutzeit and Abraham Krieg.

The above-described arrangement for facilitating the inspection of the lowermost interior portion of the plenum chamber 37 of the conveyor 11 is very advantageous as it accommodates not only visual inspection of the interior thereof through the aligned inspection ports, but it also accommodates inspection of the withdrawn tie bar 50 as an index of the condition of the interior of the plenum chamber 37; which arrangement is most advantageous when the pulverent material that is transported in the vehicle body 10 is wheat, or other edible flour, since it is apparent that sanitation is of utmost importance, and only by proper inspection may adequate safeguards with respect thereto be taken by the shipper.

The construction and arrangement of the conveyor 12 with respect to the provision of the two laterally aligned inspection ports in the opposed side walls 44 and 45 of the structure 36 is the same as that described in conjunction with the conveyor 11; whereby the conveyor 12 includes the two closure members 44' and 45' and the cooperating tie bar 53.

In view of the foregoing, it is apparent that there has been provided in a conveyor for pulverulent material of the type including a porous wall along which the material slides, when it is aerated, improved structure facilitating inspection of the interior of the plenum chamber disposed below the porous wall mentioned.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a conveyor for pulverulent material including an elongated downwardly inclined porous wall, first structure cooperating with said porous wall to define an elongated material trough thereabove, and second structure cooperating with said porous wall to define an elongated plenum chamber therebelow, whereby said porous wall constitutes the floor of said material trough and the ceiling of said plenum chamber so that pulverulent material in said material trough flows downwardly along said floor toward the lower or discharge end of said material trough when it is aerated by air under pressure penetrating said porous wall from said plenum chamber; the combination comprising two movable closure members respectively cooperating with two aligned inspection ports respectively formed in two opposing side walls of said second structure, whereby the interior of said plenum chamber may be inspected from the exterior through said inspection ports when said closure members occupy their open positions, and means including a tie bar extending through said plenum chamber for retaining said closure members in their closed positions, the opposite ends of said tie bar being detachably secured to the adjacent ones of said closure members and said tie bar being so constructed and arranged that it may be completely withdrawn from the interior of said plenum chamber through one of said inspection ports at one end thereof when the other end thereof is detached from the cooperating closure member at the other of said inspection ports, whereby said tie bar when thus withdrawn may be inspected as an index of the condition of the interior of said plenum chamber.

2. The conveyor combination set forth in claim 1, wherein at least one end of said tie bar is threaded and cooperates with a threaded opening provided in a part carried by the cooperating one of said closure members.

3. The conveyor combination set forth in claim 1, wherein said two aligned inspection ports are respectively formed in the lower ends of said two opposing side walls of said second structure at positions disposed adjacent to the discharge end of said material trough.

4. The conveyor combination set forth in claim 1, wherein said second structure is of elongated channel-like form including in addition to said two opposing side walls a bottom wall disposed below said porous wall, and wherein said two aligned inspection ports are respectively formed in said two opposing side walls of said second structure at positions disposed intermediate said bottom wall and said porous wall.

5. In a movable vehicle including an elongated bin for receiving pulverulent material and provided with a discharge opening at the bottom thereof, an elongated downwardly inclined porous wall arranged below said bin with the lower or discharge end thereof at said discharge opening, first structure arranged between said bin and said porous wall to define an elongated downwardly directed material trough therebetween, and second structure arranged below said porous wall and cooperating therewith to define an elongated plenum chamber therebelow, whereby said porous wall constitutes the floor of said material trough and the ceiling of said plenum chamber so that pulverulent material in said material trough flows downwardly along said floor into said discharge opening when it is aerated by air under pressure penetrating said porous wall from said plenum chamber; the combination comprising two movable closure members respectively cooperating with two aligned inspection ports respectively formed in two opposing side walls of said second structure, whereby the interior of said plenum chamber may be inspected from the exterior through said inspection ports when said closure members occupy their open positions, and means including a tie bar extending through said plenum chamber for retaining said closure members in their closed positions, the opposite ends of said tie bar being detachably secured to the adjacent ones of said closure members and said tie bar being so constructed and arranged that it may be completely withdrawn from the interior of said plenum chamber through one of said inspection ports at one end thereof when the other end thereof is detached from the cooperating closure members at the other of said inspection ports, whereby said tie bar when thus withdrawn may be inspected as an index of the condition of the interior of said plenum chamber.

References Cited in the file of this patent

UNITED STATES PATENTS

| | | |
|---|---|---|
| 1,081,950 | Eller | Dec. 23, 1913 |
| 1,423,088 | Crossley | July 18, 1922 |
| 2,589,968 | Schemm | Mar. 18, 1952 |